(12) United States Patent
Ding et al.

(10) Patent No.: US 10,068,600 B2
(45) Date of Patent: *Sep. 4, 2018

(54) DIRECT CURRENT MAGNETORESISTIVE JOG OFFSET COMPENSATION

(71) Applicant: SEAGATE TECHNOLOGY LLC, Cupertino, CA (US)

(72) Inventors: Mingzhong Ding, Singapore (SG); Xiong Liu, Singapore (SG); Xiang Lu, Singapore (SG); Qiang Bi, Singapore (SG); Kian Keong Ooi, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,399

(22) Filed: Oct. 6, 2017

(65) Prior Publication Data
US 2018/0033457 A1    Feb. 1, 2018

Related U.S. Application Data

(63) Continuation of application No. 15/341,246, filed on Nov. 2, 2016, now Pat. No. 9,837,111, which is a continuation of application No. 15/170,859, filed on Jun. 1, 2016, now Pat. No. 9,520,149.

(51) Int. Cl.
G11B 5/596 (2006.01)
(52) U.S. Cl.
CPC ...... *G11B 5/59627* (2013.01); *G11B 5/59694* (2013.01)

(58) Field of Classification Search
None
See application file for complete search history.

(56) References Cited

U.S. PATENT DOCUMENTS

| | | |
|---|---|---|
| 6,498,693 B1 | 12/2002 | Au et al. |
| 6,873,488 B2 | 3/2005 | Teo et al. |
| 7,193,809 B1 | 3/2007 | Allen |
| 7,352,526 B2 | 4/2008 | Takaishi |
| 7,486,468 B2 | 2/2009 | Hebbar et al. |
| 7,643,238 B2 | 1/2010 | DeGroat |
| 7,872,829 B2 | 1/2011 | Sakai |
| 7,911,724 B2 | 3/2011 | Buch et al. |
| 8,233,228 B2 | 7/2012 | Grundvig et al. |
| 8,295,004 B2 | 10/2012 | Sudo |
| 8,705,198 B1 | 4/2014 | Hebbar et al. |
| 8,730,609 B1 | 5/2014 | Tang et al. |
| 8,964,323 B1 | 2/2015 | Tang et al. |

(Continued)

*Primary Examiner* — Wayne Young
*Assistant Examiner* — James L Habermehl
(74) *Attorney, Agent, or Firm* — Holland & Hart LLP (57) ABSTRACT

Systems and methods for compensating for magnetoresistive (MR) jog offset direct current (DC) drift in a disc drive are described. In one embodiment, a method may include determining an occurrence of NOS, for example, by monitoring disc slip, to determine when the method should proceed. An MR jog offset DC drift amount is determined for each head of the disc drive. One of several approaches may be employed for determining the MR jog offset DC drift amount. By determining an MR jog offset DC drift amount for each head, a compensation profile is determined for the drive. The determined compensation profile may then be used during operation of the disc drive to compensate for the DC drift. One of several approaches may be employed for compensating based on the compensation profile.

20 Claims, 5 Drawing Sheets

(56) References Cited

U.S. PATENT DOCUMENTS

| | | |
|---|---|---|
| 9,159,369 B1 | 10/2015 | Liu et al. |
| 2001/0040752 A1 | 11/2001 | Szita et al. |
| 2007/0047133 A1 | 3/2007 | Allen |
| 2007/0097806 A1 | 5/2007 | Beker et al. |
| 2010/0134917 A1 | 6/2010 | Sakai |
| 2011/0141611 A1 | 6/2011 | Sudo |

DIRECT CURRENT MAGNETORESISTIVE JOG OFFSET COMPENSATION

RELATED APPLICATION

This application is a continuation of U.S. patent application Ser. No. 15/341,246, filed on 2 Nov. 2016 and entitled DIRECT CURRENT MAGNETORESISTIVE JOG OFFSET COMPENSATION, now U.S. Pat. No. 9,837,111, issued on 5Dec. 2017, which is a continuation of U.S. patent application Ser. No. 15/170,859, filed on 1 Jun. 2016 and entitled DIRECT CURRENT MAGNETORESISTIVE JOG OFFSET COMPENSATION, now U.S. Pat. No. 9,520,149, issued on 13 Dec. 2016, the disclosures of which are incorporated herein in their entireties, by this reference.

SUMMARY

The present disclosure is directed to methods and systems for compensating for changes in magnetoresistive (MR) jog offset in a disc drive. In some embodiments, the present systems and methods may compensate for MR jog offset DC drift resulting from non-operating shock (NOS).

A storage device for MR jog offset compensation is described. In one embodiment, the storage device may include a data storage medium comprising at least one disc, at least one magnetoresistive (MR) read/write head associated with the at least one disc, a non-operating shock (NOS) detector to determine an occurrence of NOS based at least in part on slip of the at least one disc, an MR jog offset direct current (DC) drift detector to determine an MR jog offset DC drift amount based at least in part on a variable read performed over at least one revolution of the at least one disc using the at least one MR read/write head when the NOS detector has determined the occurrence of NOS, and an MR jog offset compensator to compensate for the determined MR jog offset DC drift amount using the determined DC MR jog offset for the at least one MR read/write head.

In some embodiments, the data storage medium may include a plurality of discs and the at least one MR read/write head may comprise a plurality of MR read/write heads, each of the plurality of MR read/write heads being associated with a respective one of the plurality of discs. In some cases, the MR jog offset DC drift detector is to determine a plurality of MR jog offset DC drift amounts based on a corresponding plurality of variable reads, each of the plurality of variable reads using a respective one of the plurality of MR read/write heads, each of the determined plurality of MR jog offset DC drift amounts corresponding to the respective one of the plurality of MR read/write heads. In some configurations, the storage device further includes a correction profile determiner to determine a correction profile based at least in part on the determined plurality of MR jog offset DC drift amounts. The correction profile may be a plurality of DC MR jog offsets corresponding to the plurality of MR read/write heads. The MR jog offset compensator may compensate for the determined plurality of MR jog offset DC drift amounts using the determined correction profile.

In some embodiments, the MR jog offset compensator compensates for the determined MR jog offset DC drift amount using write seek feedforward compensation. In other embodiments, the MR jog offset compensator compensates for the determined MR jog offset DC drift amount by migrating data using shingled magnetic recording (SMR) band rewrite operation (BRO).

In some embodiments, the variable read may be a spiral read, a zig-zag read, a sinusoidal read, or some combination thereof. In other embodiments, the variable read may be a plurality of reads performed with different track offsets of the at least one MR read/write head.

In some embodiments, the MR jog offset direct current (DC) drift detector determines the MR jog offset DC drift amount based at least in part on a bit error rate (BER) measurement. In other embodiments, the MR jog offset direct current (DC) drift detector determines the MR jog offset DC drift amount based at least in part on a variable gain adjustment measurement.

An apparatus for MR jog offset compensation is also described. In one embodiment, the apparatus may include an MR jog offset direct current (DC) drift detector to determine an MR jog offset DC drift amount based at least in part on a variable read performed over at least one revolution of at least one disc of a data storage medium using at least one MR read/write head based at least in part on an occurrence of non-operating shock, and a correction profile determiner to determine a DC MR jog offset for the at least one MR read/write head based at least in part on the determined MR jog offset DC drift amount.

A method for MR jog offset compensation is also described. In one embodiment, the method may include determining an occurrence of non-operating shock (NOS) in a disc drive by monitoring disc slip, determining magnetoresistive (MR) jog offset direct current (DC) drift amount associated with the occurrence of NOS, determining a correction profile based at least in part on the MR jog offset DC drift amount, and compensating for MR jog offset DC drift using the correction profile.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following relates generally to MR jog offset compensation in a disc drive. A disc drive typically includes one or more read/write heads that are driven relative to a storage medium to write data to and read data from the medium. During production of a disc drive, once the drive has been assembled, an MR jog offset will be calibrated for the drive, for example, during a certification process. For each read-write head of the disc drive, a set of polynomial coefficients, $a_0, a_1, a_2 \ldots$, an, are determined and saved, for example, to non-volatile storage. For a given track x on a particular disc, the MR jog offset D(x) for the associated head is obtained as follows:

$$D(x) = a_0 x^n + a_1 x^{n-1} + \ldots + a_n$$

After certification, however, the MR jog offset may incur DC shift or drift. DC shift may occur, for example, as a result of non-operating shock (NOS) to the disc drive. For a mobile drive, a typical NOS specification is 1000G @ 2 ms. When a disc drive is subjected to such a high G level shock, certain mechanical components will be shifted or drifted. Note that the description herein uses the term drift to encompass both drift and shift.

Regardless of the cause of the drift, in one embodiment, the present disclosure describes an efficient method to compensate for MR jog offset DC drift in a disc drive. In the case of NOS induced drift, the method may include determining an occurrence of NOS, for example, by monitoring disc slip, to determine when the method should proceed.

In either case, an MR jog offset DC drift amount is determined for each head of the disc drive. As described further below, one of several approaches may be employed for determining the MR jog offset DC drift amount. By determining an MR jog offset DC drift amount for each head, a compensation profile is determined for the drive. The determined compensation profile is then used during operation of the disc drive to compensate for the DC drift. As described further below, one of several approaches may be employed for compensating based on the compensation profile.

Figure 1:
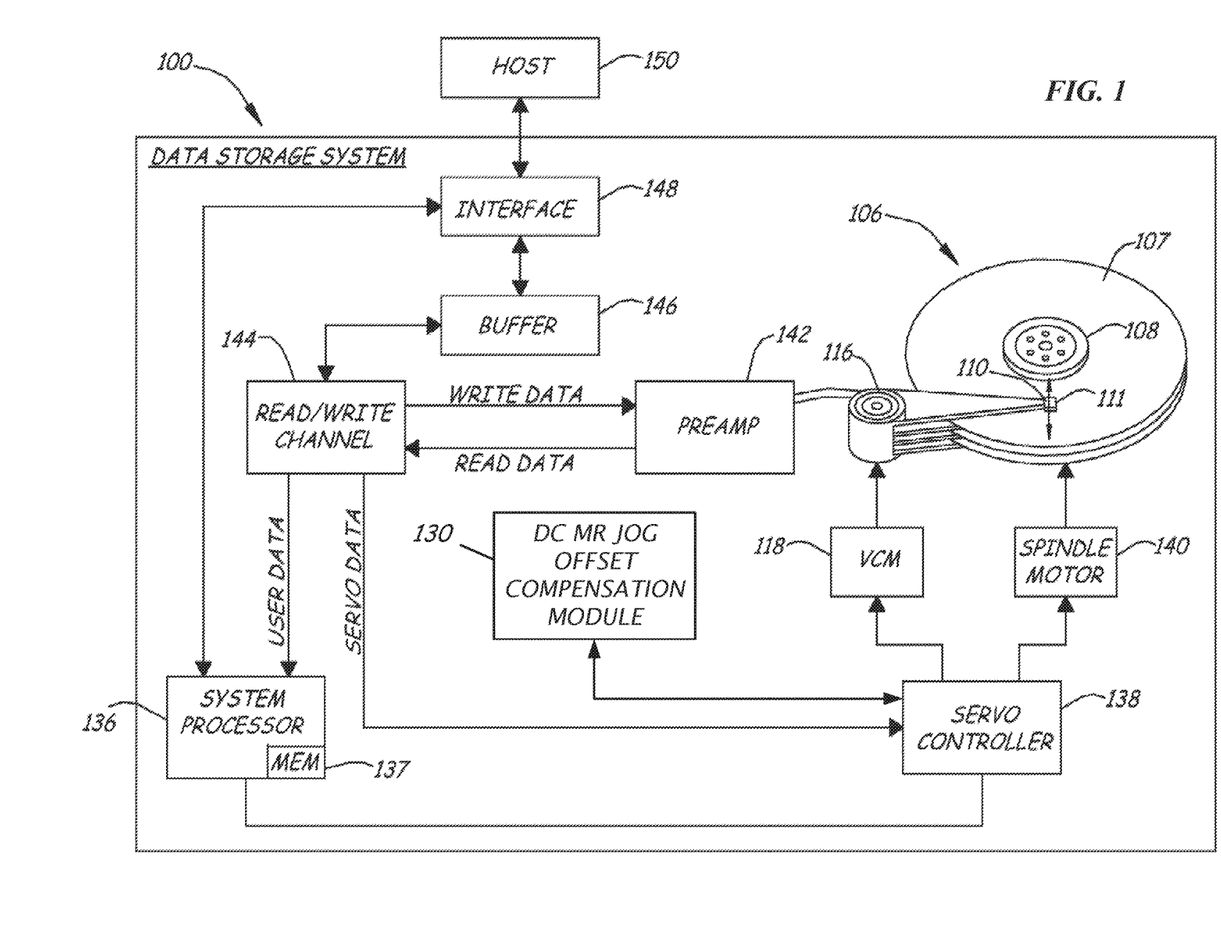
FIG. 1 is a block diagram of an example of a system in accordance with various embodiments.

FIG. 1 is a block diagram illustrating one embodiment of a data storage system 100 (e.g., a disc drive system) in which the present systems and methods may be implemented. The data storage system 100 includes media 106, such as a plurality of discs 107, which are mounted on a spindle motor 140 by a clamp 108 (also referred to as a spindle or spindle component). Each surface of the media 106 has an associated slider 110, which carries a read/write head 111 for communication with the media surface. Sliders 110 are supported by suspensions and track accessing arms of an actuator mechanism 116. For example, the actuator mechanism 116 can be of the type known as a rotary moving coil actuator and includes a voice coil motor (VCM) 118. The VCM 118 rotates actuator mechanism 116 about a pivot shaft to position sliders 110 over a desired data track along an arcuate path between an inner diameter (ID) and an outer diameter (OD) of respective discs 107. The VCM 118 is driven by electronic circuitry based on signals generated by the read/write heads 111 and a servo controller 138.

As previously discussed, media 106 can include a plurality of discs 107. Each disc 107 has a plurality of substantially concentric circular tracks. Each track is subdivided into a plurality of storage segments. As defined herein, a storage segment is the basic unit of data storage in media 106. Each storage segment is identified and located at various positions on media 106. In the disc-type media example, storage segments or data sectors are "pie-shaped" angular sections of a track that are bounded on two sides by radii of the disc and on the other side by the perimeter of the circle that defines the track. Each track has related logical block addressing (LBA). LBA includes a cylinder address, head address and sector address. A cylinder identifies a set of specific tracks on the disc surface to each disc 107 which lie at equal radii and are generally simultaneously accessible by the collection of read/write heads 111. The head address identifies which head can read the data and therefore identifies which disc from the plurality of discs 107 the data is located. As mentioned above, each track within a cylinder is further divided into sectors for storing data and servo information. The data sector is identified by an associated sector address.

The data storage system 100 includes a system processor 136, which is used for controlling certain operations of data storage system 100 in a known manner. The various operations of data storage system 100 are controlled by system processor 136 (e.g., storage controller) with the use of programming and/or instructions stored in a memory 137. The data storage system 100 also includes a servo controller 138, which generates control signals applied to the VCM 118 and spindle motor 140 (as well as the microcontroller, not shown). The system processor 136 instructs the servo controller 138 to seek read/write head 111 to desired tracks. The servo controller 138 is also responsive to servo data, such as servo burst information recorded on disc 107.

The data storage system 100 further includes a preamplifier (preamp) 142 for generating a write signal applied to a particular read/write head 111 during a write operation, and for amplifying a read signal emanating from a particular read/write head 111 during a read operation. A read/write channel 144 receives data from the system processor 136, via a buffer 144, during a write operation, and provides encoded write data to the preamplifier 142. During a read operation, the read/write channel 146 processes a read signal generated by the preamplifier 142 in order to detect and decode data recorded on the discs 107. The decoded data is provided to the system processor 136 and ultimately through an interface 148 to a host computer 150.

In some configurations, the data storage system 100 may include a DC drift compensator, such as a DC MR jog offset compensation module 130. In one example, the data storage system 100 may be a component of a host (e.g., operating system, host hardware system, etc.). The DC MR jog offset compensation module 130 may compensate for DC drift of the read/write heads 111, for example, by feedforward of a correction factor during write operation to maintain the writer at the original written-in data center. Alternatively, the DC MR jog offset compensation module 130 may compensate for DC drift of the read/write heads 111 by migrating data using shingled magnetic recording (SMR) band rewrite operations.

Figure 2A:
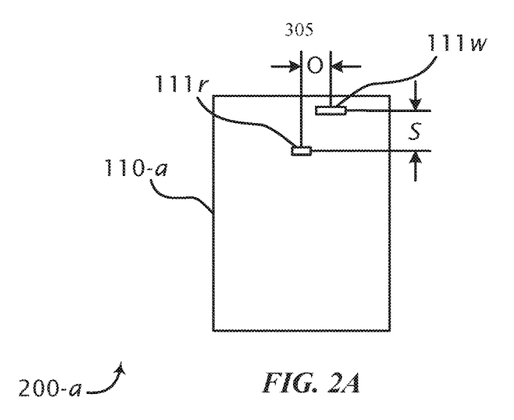
FIGS. 2A and 2B show a slider and a disc and illustrate geometry related to MR jog offset in accordance with various aspects of this disclosure.

FIG. 2A shows a block diagram 200-a illustrating a slider 110-a in accordance with various aspects of this disclosure.

As shown, the slider 110-*a* includes a read head 111*r* and a write head 111*w*, corresponding to the MR read/write head 111 shown in FIG. 1, for example. The read head 111*r* and the write head 111*w* are separated and offset from each other. As shown in FIG. 2A, the separation between the read head 111*r* and the write head 111*w* is S, which may be referred to as the R/W separation. The offset between the read head 111*r* and the write head 111*w* is 0, which may be referred to as the R/W offset. This physical separation and offset of the read head 111*r* and the write head 111*w* results in a particular MR jog offset across the surface of an associated disc.

Figure 2B:
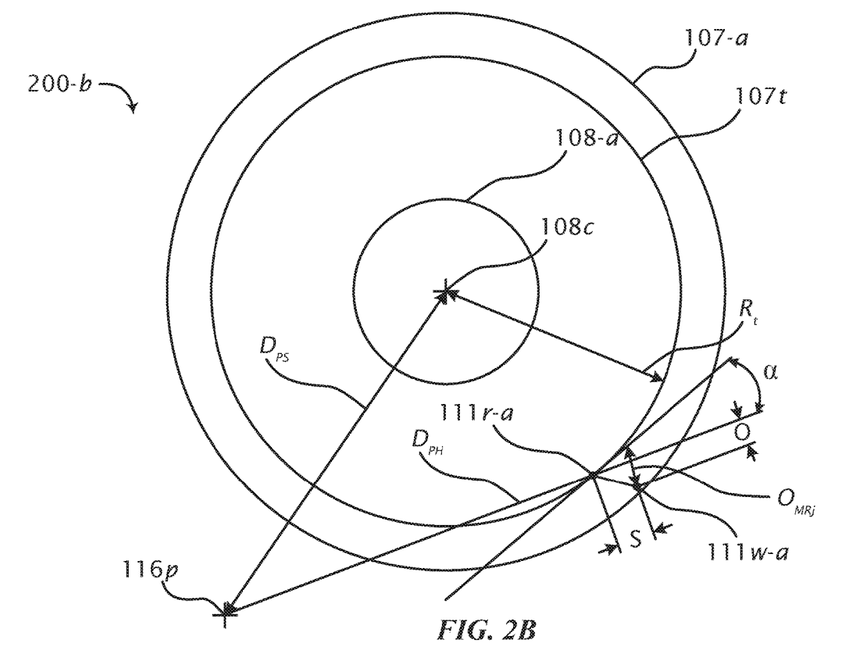

FIG. 2B shows a block diagram 200-*b* illustrating a disc 107-*a* in accordance with various aspects of this disclosure. The disc 107-*a* may have a plurality of tracks on its surface, with a track 107*t* being shown for reference. The disc 107-*a* is mounted on a spindle 108-*a*, as described above with reference to FIG. 1. Further, an actuator (not shown) having a pivot 116*p* is configured to move a slider (not shown) relative to the disc 107-*a*. The slider may be configured as shown in FIG. 2A, for example.

The slider includes a read head 111*r*-*a* and a write head 111*w*-*a*, as illustrated in FIG. 2B. As further depicted in FIG. 2B, an MR jog offset $O_{MRj}$ for the MR read/write head (read head 111*r*-*a* and 111*w*-*a*) is determined based on one or more of R/W offset O, R/W separation S, a distance $D_{PS}$ between the actuator pivot 116*p* and a center 108*c* of the spindle 108-*a*, a distance $D_{PH}$ between the actuator pivot 116*p* and the MR read/write head (e.g., the read head 111*r*-*a*), and a radius $R_t$ of the track 107*t*.

As discussed above, a disc drive may experience a NOS that drifts various mechanical components of the drive. For example, the actuator pivot may drift relative to the spindle pivot (center). With the geometrical relationship illustrated in FIG. 2B, the MR jog offset $O_{MRj}$ will incur DC drift. Also, for example, a top cover of the disc drive may drift and cause a tilt in the actuator. In such case, a top (closer to the cover) slider (e.g., MR write head) associated with a top disc will incur worse MR jog offset DC drift than a bottom slider associated with a bottom disc.

The impact of such a DC drift may be disastrous for the disc drive. For example, new data write operations after the NOS may cause DC encroachment that may corrupt the data written on an adjacent track before the NOS. With such encroachment, one or more data sectors may report an uncorrectable data error (UDE) when an attempt to read the data on the adjacent track is made. As the tracks per inch (TPI) on a disc is increased, addressing the problem of DC drift may increase in importance.

Figure 3:
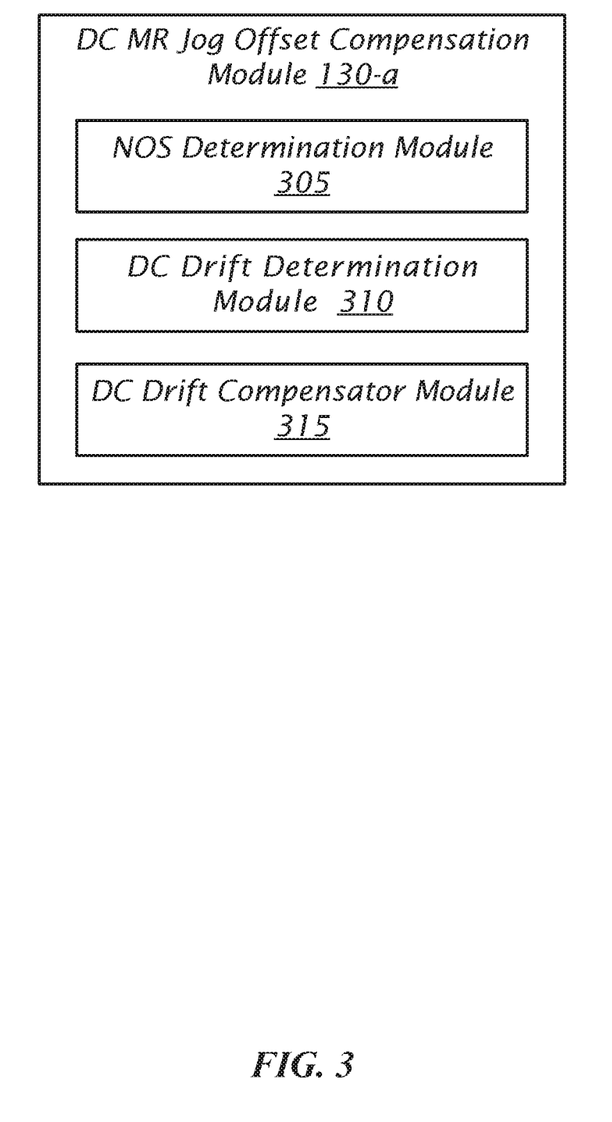
FIG. 3 shows a block diagram of an example of a module in accordance with various aspects of this disclosure.

FIG. 3. shows a block diagram 300 of a DC MR jog offset compensation module 130-*a*. The DC MR jog offset compensation module 130-*a* may include one or more processors, memory, and/or one or more storage devices. The DC MR jog offset compensation module 130-*a* may include an NOS determination module 305, a DC drift determination module 310, and a DC drift compensator module 315. Each of these components may be in communication with each other. The DC MR jog offset compensation module 130-*a* may be one example of the DC MR jog offset compensation module 130 of FIG. 1.

As described herein, the NOS determination module 305 is configured to determine when an NOS has occurred. Determination of a NOS occurrence may be used to determine when to proceed with DC drift determination and compensation. Although any suitable approach for determining NOS may be employed, the NOS determination module 305 may determine when an NOS has occurred by monitoring disc slip. For example, the NOS determination module 305 may employ the existing servo system of the disc drive, such as the system processor 136 and/or the servo controller 138 shown in the example of FIG. 1. The servo system may be configured to monitor alternating current feed-forward (ACFF) to detect occurrence of NOS. When a disc is not subjected to NOS, the data tracks are concentric and there is no AC component in the VCM current to follow a data track. However, if there is disc slip due to NOS, the data tracks become eccentric and there will be a sinusoidal component in the VCM to follow one of the data tracks. The amplitude of the ACFF is proportional to the amount of disc slip.

The DC drift determination module 310 is configured to determine an amount of DC drift incurred by each MR read/write head (or slider) in the disc drive. Although various details for determining the amount of DC drift are described, it should be understood that the amount of DC drift may be determined or otherwise obtained in any suitable manner. As described further below, the DC drift determination module 310 determines the amount of DC drift for each slider/head using at least one test track on a disc associated with the slider/head. For example, one or more test tracks across the surface of the disc may be laid out and prepared (e.g., during the certification process for the disc drive), which are reserved and not used for data storage. To determine the amount of DC drift after NOS, a new write operation is performed to the prepared test tracks. The new write data will reflect the MR jog DC drift. A subsequent read back operation (multiple read, spiral read, zig-zag read, etc.) is be used to determine the DC shift based on BER or RVGA.

In general, bit error rate (BER) is a function of an amount of the reader (e.g., read head) being off-track, wherein a larger off-track of the reader corresponds to a lower BER. In the case of an MR jog offset DC shift occurring, the relationship between the BER (e.g., raw sector) and the reader off-track amount (e.g., percent track position) correspondingly shifts. As such, the DC drift determination module 310 can determine the DC shift amount by measuring cross-track BER of the test track, with the highest BER corresponding to the DC drift amount.

Alternatively, the DC drift determination module 310 can determine the DC shift amount based on the relationship between read variable gain adjustment (read VGA or VGAR) and the reader off-track amount. In this case, the DC drift determination module 310 can determine the DC shift amount by measuring cross-track VGAR of the test track, with the lowest VGAR corresponding to the DC drift amount.

For either the BER or the VGA approach, several techniques may be employed. For the sake of brevity and clarity, the following techniques are discussed with respect to BER. However, it should be understood that each of these techniques may be employed for the VGA approach as well.

A first technique is to perform multiple reads, each with a different reader offset (e.g., from negative to positive), to measure BER and obtain BER values for each offset. The DC drift amount is then determined as the offset corresponding to the highest BER value. A potential downside to this technique is the multiple reads at different track offset for each slider/head, which may be relatively time-consuming and could negatively impact performance of the disc drive.

A second technique is to perform a spiral read by positioning the reader progressively over a range of offsets (e.g., from an original (pre-drift/pre-NOS) offset minus fifty percent (D−50%) to the original offset plus fifty percent (D+50%) during one revolution of the disc. This can be achieved, for example, by adjusting to different set point values for different servo sectors. As such, the spiral read technique can achieve a relatively quick sector-wise BER measurement, from which the highest BER and corresponding offset is determined to determine the DC drift amount.

More particularly, to read from negative fifty percent (−50%) off-track to fifty percent (50%) off-track, the position set point for a given sector m is X+D+C(m), with C(m) calculated as follows:

$$C(m) = -50\% + \frac{100\%}{N}m$$

where N is the total number of servo sectors. By disabling read retry, a relationship between sector-wise BER and data sector l is obtained from reading over one revolution of the disc. In general, the relationship between data sector l and servo sector m is predetermined, for example, by a read/write (R/W) zone table for the disc drive. The foregoing equation maps servo sector m to a physical off-track amount C. A second order polynomial fit of BER to off-track amount C is given by:

$$BER = a*C^2 + b*C + c$$

The off-track amount $C_x$ corresponding to the highest BER is given by:

$$C_x = -\frac{b}{2a},$$

where $C_x$ is the MR jog offset DC drift amount C for test track x.

Repeating the above on all test tracks across the whole surface of each disc for each respective slider/head obtains DC shift values that can be used to populate a DC MR jog offset correction table for each slider/head, which can be saved to non-volatile storage of the disc drive, for example, for use in future write operations (e.g., feedforward correction, discussed below). The DC MR jog offset correction values can still be in the form of polynomial coefficients, $b_0$, $b_1, b_2 \ldots, b_n$, similar to the original calibrated/certification MR jog offset values for a given track x on a particular disc, the MR jog offset correction value C(x) for the associated head is obtained as follows:

$$C(x) = b_0 x^n + b_1 x^{n-1} + \ldots + b_n$$

Additional techniques, similar to the second technique, may involve a zig-zag movement of the reader or a sinusoidal movement of the reader, for example, through +/−50% track offset, to obtain multiple reads per sector over one revolution of the disc. Thus, multiple sector wise BER measurements are obtained for each track offset. The multiple measurements are then averaged to obtain a single BER value for each sector. As above, the offset corresponding to the highest BER value is the MR jog offset DC drift amount.

Once the DC drift amount has been determined for each slider/head of the disc drive), the DC drift compensator module 315 determines a correction factor or MR jog offset adjustment value for compensating the positioning of each slider/head for future read/write operations. For a disc drive including multiple discs and associated sliders/heads, the correction factors/adjustment values for the sliders/heads may be stored (e.g., in memory 137) as a correction profile. The correction profile is then accessed for read/write commands (according to the particular disc to be read from/written to) to properly position the appropriate slider/head.

As described further below, the correction profile may be employed using feedforward during write operation, i.e., using the compensation value C(x) during write operation as a feedforward value to the reader position, in order to place the writer to the center of the original written-in data path to avoid off-track encroachment. During read operation, the original MR jog table D(x), obtained during CERT process to place the reader to the written-in data path, is used to retrieve data. Alternatively, for a data migration approach using BRO, the compensation value C(x) is not used during write operation, and the new data path will be with some offset (e.g., in the amount of C(x)) from the original written-in data path. For this case, the compensation value C(x) is used in conjunction with D(x) (i.e., D(x)−C(x)) when later attempting to read back the "newly" written data. Only D(x) is used to retrieve "old" written data.

The DC drift compensator module 315 may use the correction profile in any suitable manner to compensate for the DC shift, for example, to avoid data encroachment on adjacent tracks. For example, the DC drift compensator module 315 can adjust the positioning of the read head during write operations by feedforward of the correction factor/offset adjustment value C(x) into the servo position set point. In such a manner, the write head is positioned to the original (pre-drift/pre-NOS) position for a given track. For read operations, the original (e.g., certification process) MR jog offset D(x) is used.

As an alternative, the DC drift compensator module 315 can use full band rewrite operation (BRO) to write a whole shingled magnetic recording (SMR) band. During the BRO, the servo position set point remains at the original center of the particular track. Thus, the newly written data is shifted away from the original data center of the track by the corresponding correction factor/adjustment value C(x). When writing according to the shingle direction, the whole band is shifted by the correction factor/adjustment value. Because of a fat track or a fat track and a guard band situated between bands according to SMR, the write operation for a last track of a band will not cause encroachment to the first track of the adjacent band. However, for a correction factor/adjustment value that is significantly large (e.g., such that encroachment on the next band is likely to occur), the data of the first track(s) of the adjacent band may be read back into a data buffer before performing the full BRO in the preceding SMR band.

For each new write operation after NOS, a full BRO for the band to which the data track belongs should be performed. Additionally, the SMR bands should be tracked with respect to the BRO—keeping track of which SMR bands have been subjected to BRO and which have not. To read back original data (e.g., data that was written before the drift/NOS), the original (pre-drift/pre-NOS) MR jog offset D(x)—C(x) is used. Alternatively, or additionally, original data may be corrected (e.g., in background tasks) by reading the original data from a band back into a data buffer, and then re-writing using a full BRO for the whole band. Also, SMR band usage may be monitored and recorded, so that, if data was never written to a particular SMR band before the DC drift/NOS, the SMR band can be skipped for data migration.

One or more of the components of the DC MR jog offset compensation module 130-a, individually or collectively, may be implemented using one or more application-specific integrated circuits (ASICs) adapted to perform some or all of the applicable functions in hardware. Alternatively, the functions may be performed by one or more other processing units (or cores), one or more integrated circuits, or combinations thereof. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

Figure 4:
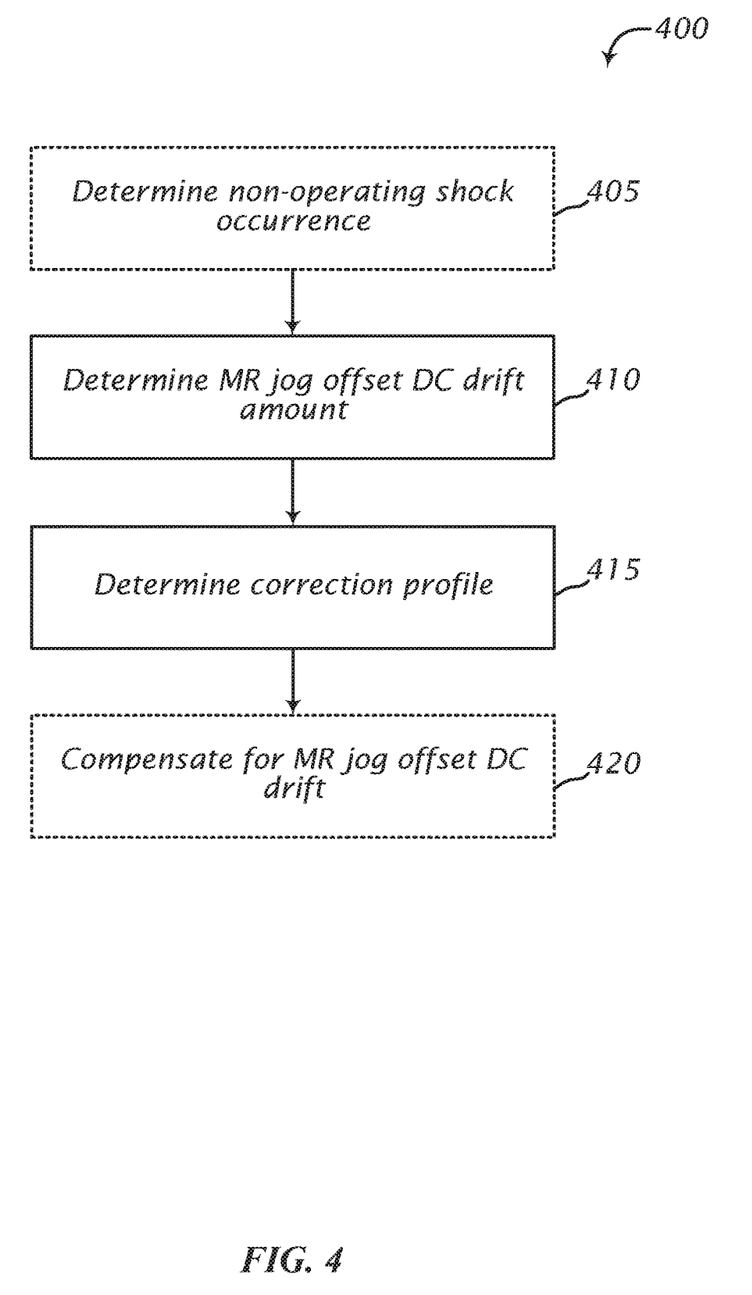
FIG. 4 is a flow chart illustrating an example of a method in accordance with various aspects of this disclosure.

FIG. 4 is a flow chart illustrating an example of a method 400 for DC MR jog offset compensation in a disc drive, in accordance with various aspects of the present disclosure. One or more aspects of the method 400 may be implemented in conjunction with the data storage system 100 of FIG. 1, the subassemblies of FIGS. 2A-2B, and/or the DC MR jog offset compensation module 130-a of FIG. 3. In some examples, a storage device may execute one or more sets of codes to control the functional elements of the storage device to perform one or more of the functions described below. Additionally or alternatively, the storage device may perform one or more of the functions described below using special-purpose hardware.

At block 405, the method 400 may include determining an occurrence of non-operating shock (NOS). Determining the NOS occurrence at block 405 may be performed in any suitable manner, such as described above with reference to FIG. 3. As illustrated by the dotted line of block 405, such operation(s) may be optional, for example, to be performed at startup of the disc drive when the method 400 is to address DC MR jog offset compensation due to NOS.

At block 410, the method 400 may include determining an MR jog offset DC drift amount. For example, the operation(s) at block 410 may involve performing any one of the techniques described above with reference to FIG. 3.

Next at block 415, the method 400 may include determining a correction profile for multiple sliders/heads of the disc drive. For example, the operation(s) at block 415 may involve obtaining multiple offset values for each slider/head from performance of the operation(s) at block 410 on a per track basis. In other words, a correction profile may be obtained for each head, with the correction value being calculated on a per track basis. Once determined, the correction profile can be stored locally at the disc drive.

Then at block 420, the method 400 may include compensating for MR jog offset DC drift. For example, the operation(s) at block 410 may involve performing either of the BER or the VGA approaches described above with reference to FIG. 3. As illustrated by the dotted line of block 420, such operation(s) may be optional. In some cases, the method 400 may end with the operation(s) at block 415. For example, if no write operations occur after the NOS and before a subsequent NOS, no compensation for the MR jog offset drift may be performed (e.g., in the case of the feedforward correction approach discussed above). In the case of the SMR BRO approach discussed above, proactive correction of original data may be performed, with or without write operations occurring after the NOS and before a subsequent NOS.

The operation(s) at block 405-420 may be performed using the DC MR jog offset compensation module 130 described with reference to FIGS. 1 and 2 and/or another module. Thus, the method 400 may provide for DC MR jog offset compensation in a disc drive that experiences DC drift due to NOS or other reasons. It should be noted that the method 400 is just one implementation and that the operations of the method 400 may be rearranged, omitted, and/or otherwise modified such that other implementations are possible and contemplated.

Figure 5:
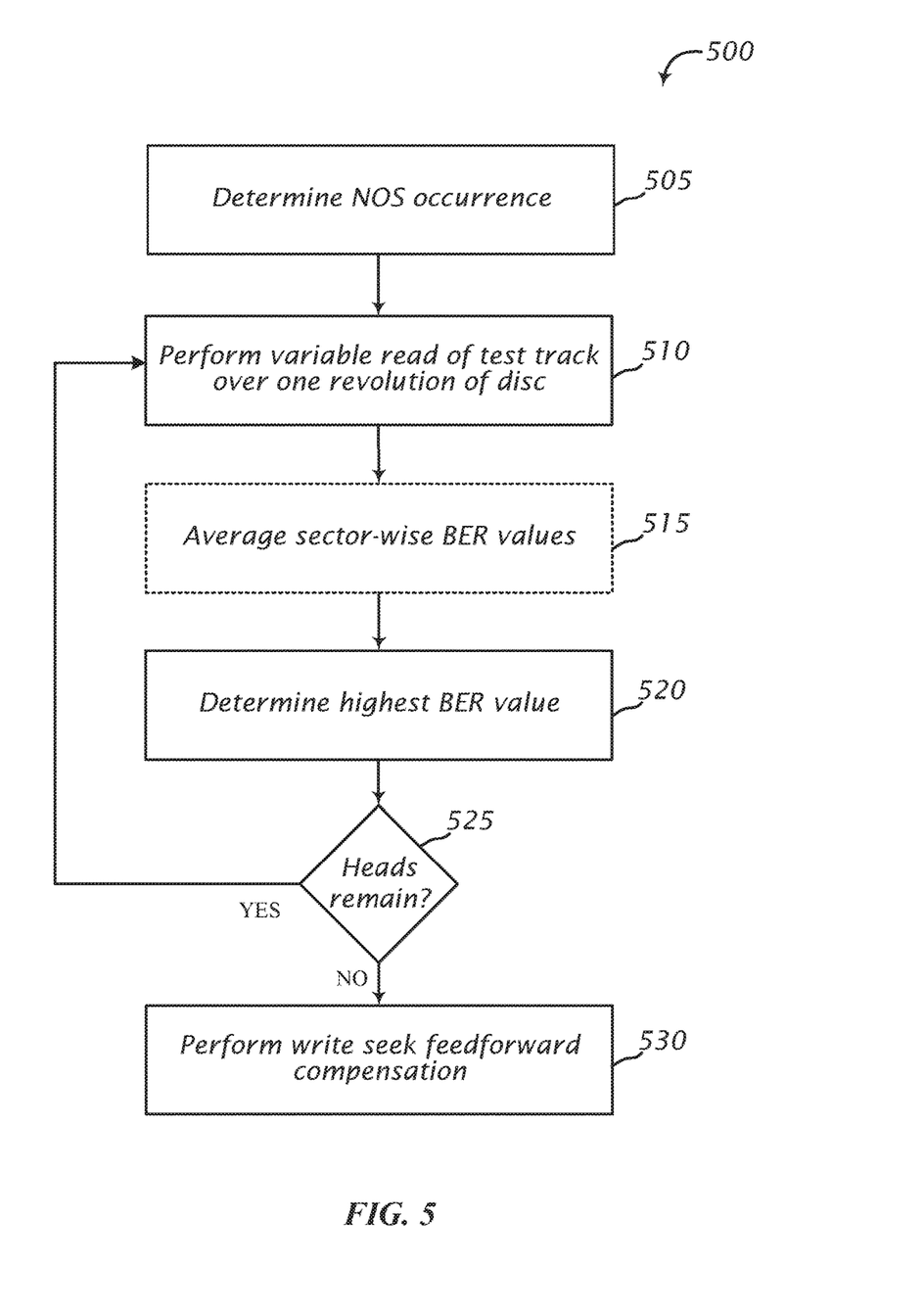
FIG. 5 is a flow chart illustrating an example of another method in accordance with various aspects of this disclosure.

FIG. 5 is a flow chart illustrating an example of another method 500 for DC MR jog offset compensation in a disc drive, in accordance with various aspects of the present disclosure. More specifically, the method 500 may be employed to implement particular approaches described herein. One or more aspects of the method 500 may be implemented in conjunction with the data storage system 100 of FIG. 1, the subassemblies of FIGS. 2A-2B, and/or the DC MR jog offset compensation module 130-a of FIG. 3. In some examples, a storage device may execute one or more sets of codes to control the functional elements of the storage device to perform one or more of the functions described below. Additionally or alternatively, the storage device may perform one or more of the functions described below using special-purpose hardware.

At block 505, the method 500 may include determining an occurrence of non-operating shock (NOS). Determining the NOS occurrence at block 405 may be performed in any suitable manner, such as described above with reference to FIG. 3. The method 500 may be considered to be specific to DC MR jog offset compensation for DC drift caused by NOS.

At block 510, the method 500 may include performing a variable read of a test track over one revolution of a particular disc. The variable read at block 510 may be performed in any suitable manner, such as described above with reference to FIG. 3. At block 515, the method 500 may include averaging sector-wise BER values obtained from the operation(s) at block 510. As illustrated by the dotted line of block 515, such operation(s) may be optional. In some cases, the operations at block 510 may involve obtaining multiple reads per sector over one revolution of the disc (e.g., zig-zag or sinusoidal movement of the reader). In such cases, the method 500 may include the averaging operation(s) at block 515. In other embodiments, the operations at block 510 may involve obtaining a single read per sector or offset (e.g., N revolutions each read at different offset or spiral movement of the reader over one revolution), which would not require the averaging operation(s) at block 515.

At block 520, the method 500 may include determining the highest BER value from the results of the variable read operation(s) at block 510, with or without the averaging operation(s) at block 515. As discussed above, the offset corresponding to the highest BER may be used as the DC drift amount. The method 500 may continue to block 525, at which a determination may be made as to whether any sliders/heads remain for which the DC drift is to be determined. If so, the method 500 may return to block 510 to repeat operations for a subsequent slider/head. If not (e.g., the DC drift amount(s) for each slider/head are determined), the method 500 may continue to block 530, at which the method 500 may include performing write seek forward compensation based at least in part on the determined DC drift amount(s) for the particular slider/head for each write operation occurring after the NOS.

The operations at blocks 505-530 may be performed using the DC MR jog offset compensation module 130 described with reference to FIGS. 1 and 2 and/or another module. Thus, the method 500 may provide for DC MR jog offset compensation in a disc drive that experiences DC drift due to NOS as described herein. It should be noted that the method 500 is just one implementation and that the operations of the method 500 may be rearranged, omitted, and/or otherwise modified such that other implementations are possible and contemplated.

In some examples, aspects from the methods 400 and 500 may be combined and/or separated. It should be noted that the methods 400 and 500 are just example implementations, and that the operations of the methods 400 and 500 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (e.g., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disc storage, magnetic disc storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave, or any combination thereof, are included in the definition of medium. Disc, as used herein, include compact disc (CD), laser disc, optical disc, digital versatile disc (DVD), floppy disc and Blu-ray disc where discs usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage device comprising:
   a non-operating shock (NOS) detector to determine an occurrence of NOS; and
   an MR jog offset direct current (DC) drift detector to select a first read/write head of the storage device, use the first read/write head to perform a first variable read of a first test track over one revolution of a first disk surface, determine a highest bit error rate (BER) value of the first disk surface based at least in part on the first variable read, and use an offset associated with the highest BER value of the first disk surface as a first DC drift amount for the first read/write head.

2. The storage device of claim 1, the MR jog offset DC drift detector to determine whether the storage device includes one or more read/write heads in addition to the first read/write head for which the DC drift remains to be determined.

3. The storage device of claim 2, upon determining the storage device does not include any further read/write heads for which the DC drift remains to be determined, an MR jog offset compensator to perform write seek forward compensation based at least in part on the first DC drift amount for each write operation occurring after the NOS that involves the first read/write head.

4. The storage device of claim 3, upon determining the storage device includes a second read/write head for which the DC drift remains to be determined, the MR jog offset DC drift detector to use the second read/write head to perform a second variable read of a second test track over one revolution of a second disk surface, determine a highest BER value of the second disk surface based at least in part on the second variable read, and use an offset associated with the highest BER of the second disk surface as a second DC drift amount for the second read/write head, wherein the one or more read/write heads includes the second read/write head.

5. The storage device of claim 4, upon determining the storage device does not include any further read/write heads for which the DC drift remains to be determined, the MR jog offset compensator to perform write seek forward compensation based at least in part on the first DC drift amount for each write operation occurring after the NOS that involves the first read/write head, and perform write seek forward compensation based at least in part on the second DC drift amount for each write operation occurring after the NOS that involves the second read/write head.

6. The storage device of claim 4, wherein the second disk surface is on a same disk as the first disk surface or on a different disk than the first disk surface.

7. The storage device of claim 1, wherein performing the first variable read of the first test track over one revolution of the first disk surface comprises the MR jog offset DC drift detector obtaining one or more reads per sector over the one revolution of the first disk surface, wherein the MR jog offset DC drift determines one or more BER values per sector based at least in part on the first variable read.

8. The storage device of claim 7, wherein upon determining two or more BER values are determined per sector of the first disk surface, the MR jog offset DC drift detector to average the multiple BER values of each sector to obtain a single BER value for each sector of the first disk surface, wherein the highest BER value for the first disk surface comprises a highest BER value among the averaged BER values for each sector of the first disk surface.

9. The storage device of claim 1, wherein performing the first variable read of the first test track over one revolution of the first disk surface comprises performing a spiral read, a zig-zag read, or a sinusoidal read, or any combination thereof.

10. The storage device of claim 1, wherein the MR jog offset DC drift detector determines one or more variable gain adjustment (VGA) values for each sector based at least in part on the performing of the first variable read of the test track over one revolution of the first disk surface.

11. The storage device of claim 1, wherein determining the occurrence of NOS is based at least in part on slip of at least one storage disk.

12. An apparatus comprising:
    a non-operating shock (NOS) detector to determine an occurrence of NOS; and
    an MR jog offset direct current (DC) drift detector to select a first read/write head of the storage device, use the first read/write head to perform a first variable read of a first test track over one revolution of a first disk surface, determine a highest bit error rate (BER) value of the first disk surface based at least in part on the first variable read, and use an offset associated with the highest BER of the first disk surface as a first DC drift amount for the first read/write head.

13. The apparatus of claim 12, the MR jog offset DC drift detector to determine whether the storage device includes one or more read/write heads in addition to the first read/write head for which the DC drift remains to be determined.

14. The apparatus of claim 13, upon determining the storage device does not include any further read/write heads for which the DC drift remains to be determined, an MR jog offset compensator to perform write seek forward compensation based at least in part on the first DC drift amount for each write operation occurring after the NOS that involves the first read/write head.

15. The apparatus of claim 14, upon determining the storage device includes a second read/write head for which the DC drift remains to be determined, the MR jog offset DC drift detector to use the second read/write head to perform a second variable read of a second test track over one revolution of a second disk surface, determine a highest BER value of the second disk surface based at least in part on the second variable read, and use an offset associated with the highest BER of the second disk surface as a second DC drift amount for the second read/write head, wherein the one or more read/write heads includes the second read/write head.

16. The apparatus of claim 15, upon determining the storage device does not include any further read/write heads for which the DC drift remains to be determined, the MR jog offset compensator to perform write seek forward compensation based at least in part on the first DC drift amount for each write operation occurring after the NOS that involves the first read/write head, and perform write seek forward compensation based at least in part on the second DC drift amount for each write operation occurring after the NOS that involves the second read/write head.

17. The apparatus of claim 15, wherein the second disk surface is on a same disk as the first disk surface or on a different disk than the first disk surface.

18. The apparatus of claim 12, wherein performing the first variable read of the first test track over one revolution of the first disk surface comprises the MR jog offset DC drift detector obtaining one or more reads per sector over the one revolution of the first disk surface, wherein the MR jog offset DC drift determines one or more BER values per sector based at least in part on the first variable read.

19. A method comprising:
   determining an occurrence of non-operating shock (NOS) on a storage drive, determining the occurrence of NOS being based at least in part on slip of at least one storage disk;
   selecting a first read/write head of the storage device;
   using the first read/write head to perform a first variable read of a first test track over one revolution of a first disk surface of the storage drive;
   determining a highest bit error rate (BER) value of the first disk surface based at least in part on the first variable read; and
   using an offset associated with the highest BER of the first disk surface as a first DC drift amount for the first read/write head.

20. The method of claim 19, further comprising:
   determining whether the storage device includes one or more read/write heads in addition to the first read/write head for which the DC drift remains to be determined;
   upon determining the storage device does not include any further read/write heads for which the DC drift remains to be determined, an MR jog offset compensator to perform write seek forward compensation based at least in part on the first DC drift amount for each write operation occurring after the NOS that involves the first read/write head; and
   upon determining the storage device includes a second read/write head for which the DC drift remains to be determined, the MR jog offset DC drift detector to use the second read/write head to perform a second variable read of a second test track over one revolution of a second disk surface, determine a highest BER value of the second disk surface based at least in part on the second variable read, and use an offset associated with the highest BER of the second disk surface as a second DC drift amount for the second read/write head, wherein the one or more read/write heads includes the second read/write head.

* * * * *